United States Patent [19]
Radig

[11] 3,902,264
[45] Sept. 2, 1975

[54] BLIND FOR HUNTERS AND THE LIKE

[76] Inventor: Theodore Newman Radig, 310 S. Union St., Emporia, Kans. 66801

[22] Filed: Dec. 9, 1974

[21] Appl. No.: 530,848

[52] U.S. Cl. ................................... 43/1; 135/1 R
[51] Int. Cl.[2] ...................................... A01M 31/02
[58] Field of Search .................. 43/1; 135/1 R, 2, 3; 297/217

[56] References Cited
UNITED STATES PATENTS

| | | | |
|---|---|---|---|
| 2,159,273 | 5/1939 | Killinger | 135/1 R |
| 3,513,605 | 5/1970 | Smith | 43/1 |
| 3,540,170 | 11/1970 | Flowers | 43/1 |
| 3,609,905 | 10/1971 | Fuhrman et al. | 43/1 |
| 3,848,352 | 11/1974 | Sayles | 43/1 |

Primary Examiner—Warner H. Camp
Attorney, Agent, or Firm—Schmidt, Johnson, Hovey & Williams

[57] ABSTRACT

A portable blind is provided in which a frame structure is received by a ground-engaging portable base and includes a collapsible shroud carried by the frame structure to present a concealment cover. The frame structure includes a plurality of shroud-supporting elements of which at least two define a forward pair of elements swingably mounted for movement about respective vertical axes. A shiftable positioner mechanism is carried by the frame structure for positioning and releasably holding the forward elements in a first relative disposition presenting a cover and includes means for causing the two forward elements to swing to a second relative disposition partially collapsing the cover to present an opening therein affording an unobstructed, forward field of view. Mounted on the frame structure is a selectively actuatable release device operably coupled with the positioner mechanism for simultaneously releasing the forward elements when the device is actuated by the occupant of the blind. The positioner mechanism is capable of adjustably positioning the elements, in order to provide either full closure or a relatively narrow surveillance gap in the cover when the elements are in their first dispositions.

9 Claims, 12 Drawing Figures

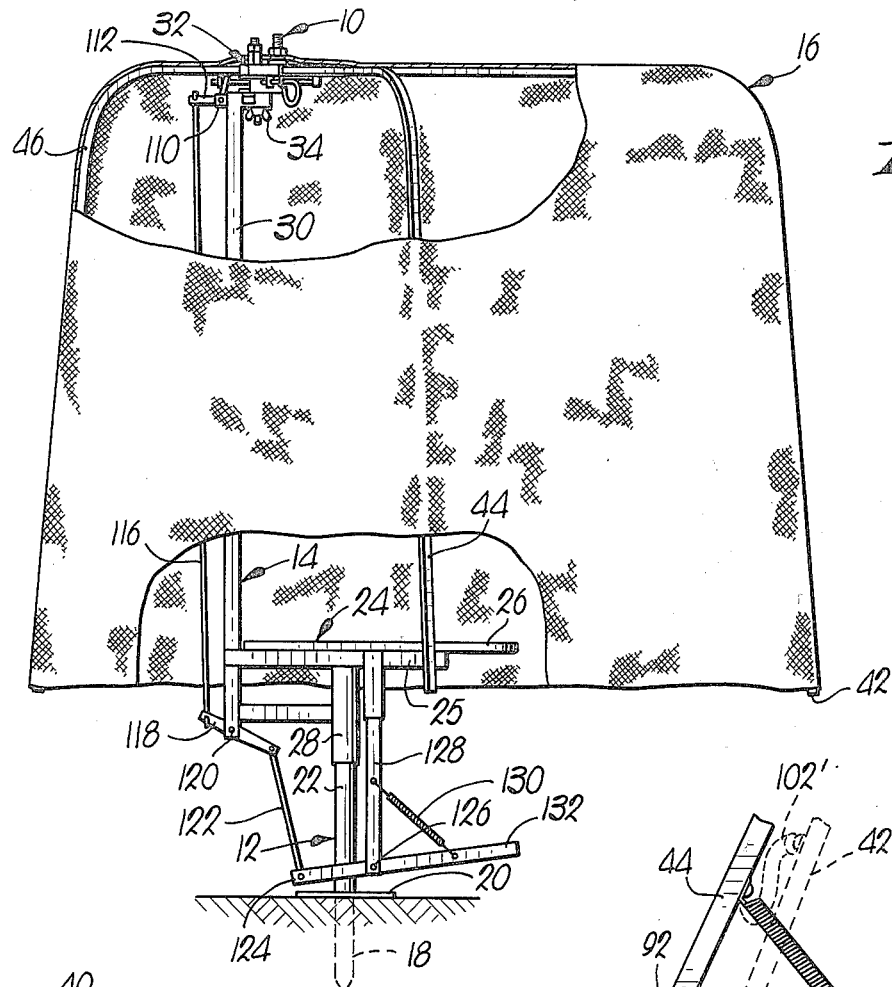
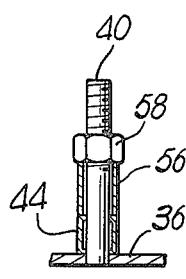
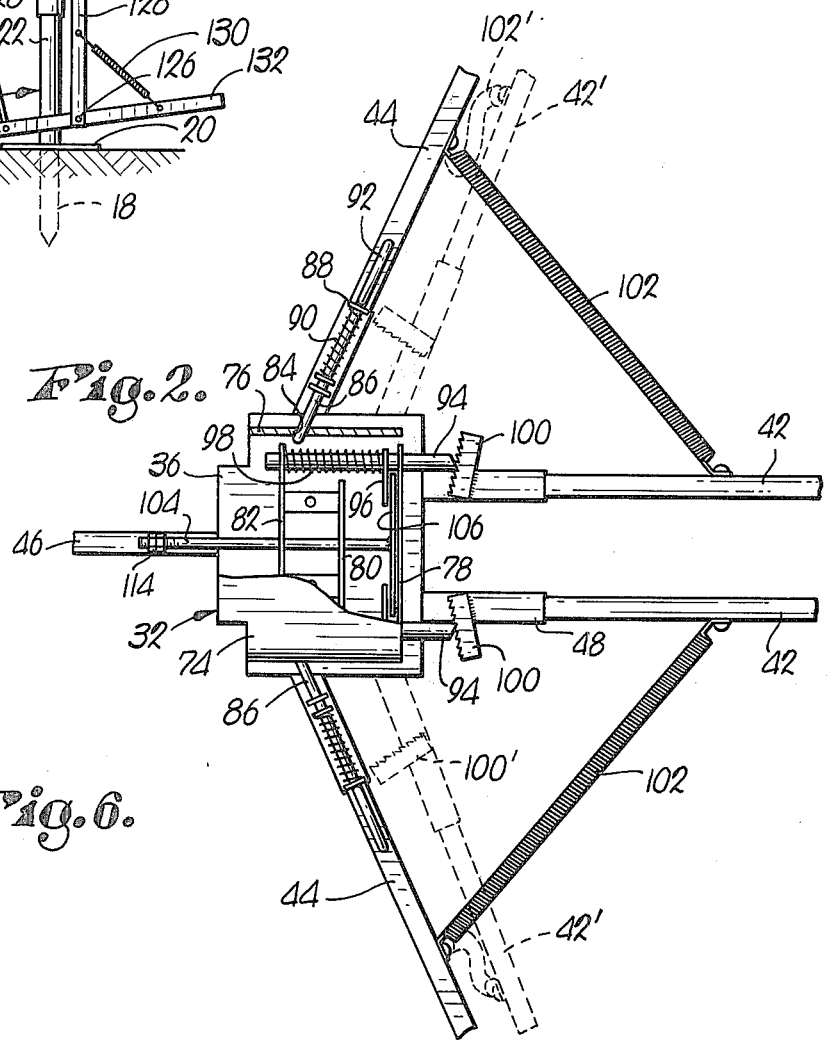
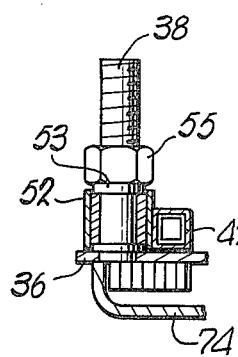

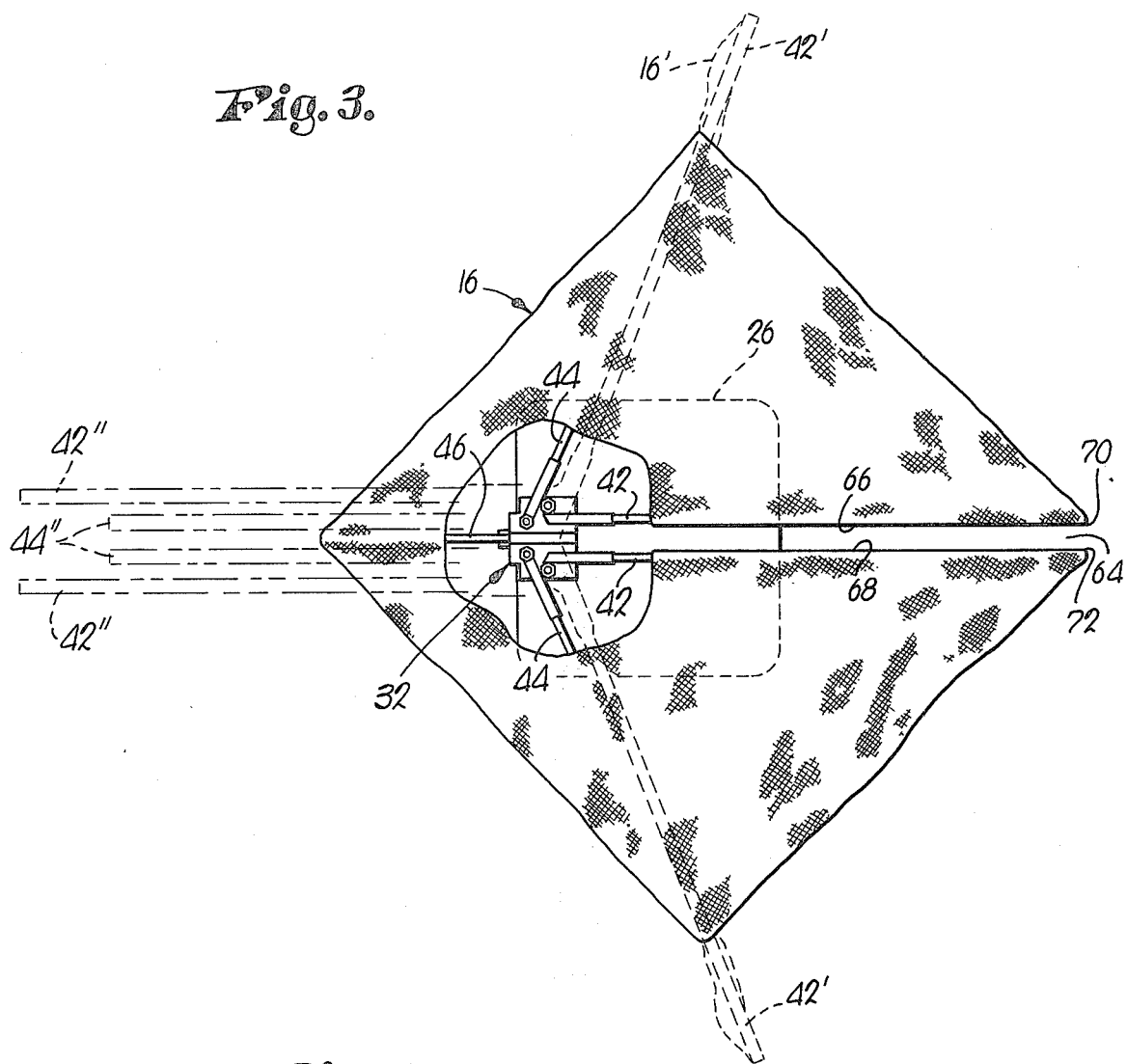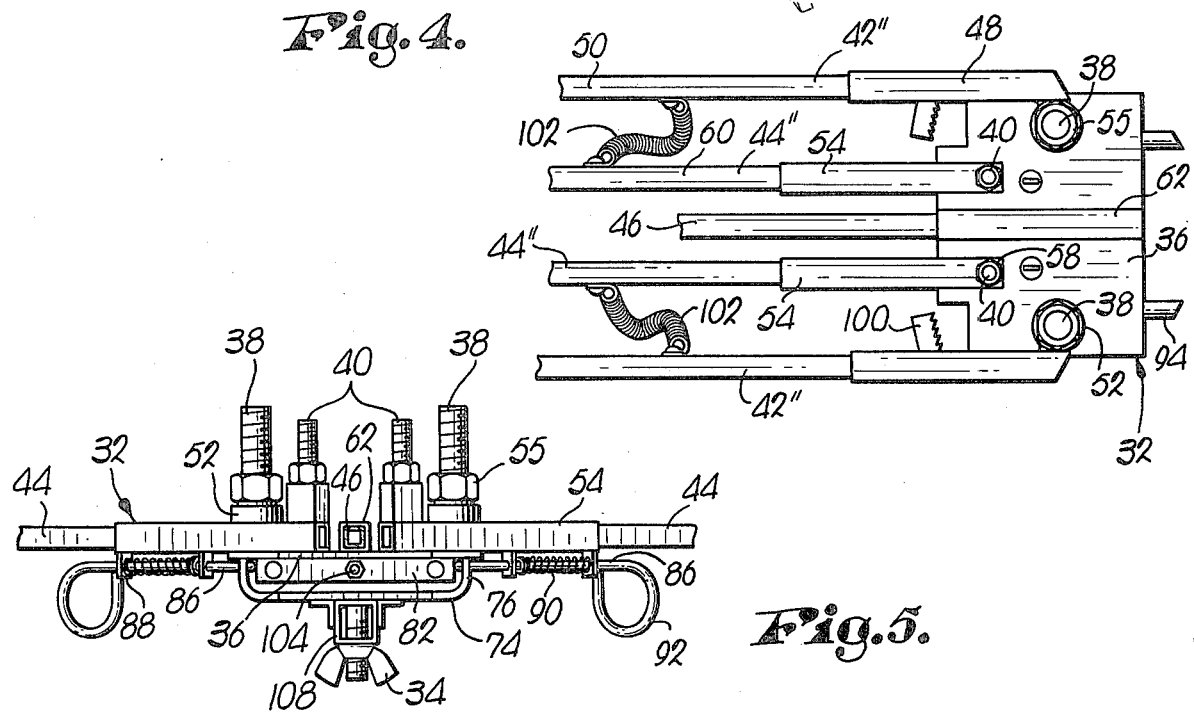

BLIND FOR HUNTERS AND THE LIKE

This invention relates to an improved portable blind of the kind frequently employed by hunters, photographers or others interested in observing wildlife in the field and, more specifically, to an improved form of the blind disclosed in my U.S. Pat. No. 3,622,201, entitled "PORTABLE BLIND," issued on Nov. 23, 1971.

It has been found that, when using a portable blind, any need for using the hands to release or move the concealment elements thereof from their cover presenting disposition to their blind opening disposition can be both inconvenient and distracting, at the very time the user also needs to be using his hands for handling his firearm, camera, or the like.

Therefore, it is the primary object of this invention to provide an improved portable hunting or observing blind in which the concealment elements thereof may be conveniently and reliably released for opening without the user employing his hands in such operation, so that he may maintain a gun or camera in readiness for immediate use upon opening of the blind.

Another important object of the invention is to provide such a portable blind having a releasable positioning and moving mechanism for the shroud-supporting elements thereof, which permits the latter to be adjustably positioned either to provide full cover or to present a relatively narrow surveillance gap of desired width in the cover when the elements are in their normal concealment disposition, and which, upon release, moves the elements quickly to the rear to open the blind for shooting, photographing or viewing through a wide frontal area.

A still further important object of my invention is to provide such a blind in which the positioning and moving mechanism for the shroud-supporting elements is controlled by a foot pedal operated release.

Still other objects and advantages of the invention will be noted or become apparent from the description of my preferred embodiment hereunder.

In the drawings:

FIG. 1 is a side elevational view of a blind for hunters, photographers or the like made pursuant to the present invention, a portion of the cover shroud thereof being broken away to reveal inner details of construction;

FIG. 2 is a fragmentary, enlarged, bottom plan view of the positioning and moving mechanism and the shroud-supporting elements in their normal concealment or cover presenting dispositions, with a second relative disposition of the two front elements to present an open and unobstructed forward field of view being indicated in dotted lines, a portion of the frame structure being broken away to reveal inner details of construction;

FIG. 3 is a top plan view of the blind with the shroud in its concealment or cover condition, a portion of the cover being broken away to reveal certain details of the positioner mechanism; dotted lines depict the shroud-supporting elements in their second relative disposition in which the shroud is partially collapsed to present an unobstructed forward field of view, while the dot-dash lines depict such elements in a third disposition to which they may be moved to completely collapse the cover for transportation or storage purposes;

FIG. 4 is an enlarged, fragmentary plan view showing shroud-supporting elements folded into such third disposition for storage or transportation of the blind;

FIG. 5 is an enlarged, rear elevational view of portions of the shroud-supporting elements and the positioning and moving mechanism;

FIG. 6 is an enlarged, detail view, primarily in section, of the pivotal connection provided for each of the forwardly facing shroud-supporting elements; and FIG. 7 is an enlarged, fragmentary view, primarily in cross-section, showing the pivotal connection of one of the more rearward shroud-supporting elements.

Referring initially to FIG. 1, my improved portable blind 10 is shown in its preferred form and broadly includes a ground-engaging base 12, a frame structure 14 rotatably mounted the base 12, and a collapsible cover shroud 16 carried by the frame structure 14.

The base 12 is in the nature of an elongate stake member having a pointed lower length 18 adapted to be inserted into the ground, an intermediate, outwardly extending flange 20 adapted to serve as a stop when the length 18 of the base 12 is emplaced in the ground, and an upper length 22 extending upwardly above the ground and the flange 20 for rotatably supporting the frame structure 14.

The frame structure 14 broadly includes a lower frame assembly 24 having a horizontally disposed main frame member 25, a seat 26 suitably secured to the member 25 and a downwardly extending socket 28 adapted to rotatably fit upon the upwardly extending length 22 of the frame structure 14; a standard 30 secured to the member 25 and extending upwardly from the lower frame assembly 24; and an upper frame assembly 32 releasably secured to the upper free end of the standard 30 by means of a threaded fastener 34.

The upper frame assembly 32 includes a top plate 36 having thereon a series of upwardly extending stud bolts 38 and 40 which swingably mount corresponding forward shroud-supporting elements 42 and rearward shroud-supporting elements 44. A fifth shroud-supporting element 46 is fixedly supported on the plate 36 in any suitable fashion and extends rearwardly therefrom. The elements 42, 44 and 46 each are of inverted, generally L-shaped configuration extending outwardly and downwardly from their mounting upon the plate 36. The elements 42 and 44 are shown in their normal or cover disposition in FIG. 1 and in solid lines in FIGS. 2 and 3; the elements 42 are shown in their opened disposition in dotted lines in FIGS. 2 and 3; and the elements 42 and 44 are shown in their stowage disposition in FIG. 4 and in dot-dash lines in FIG. 3. The elements 42, 44 and 46 may be constructed of any suitable preferably light weight tubing, rod material or the like.

In the preferred embodiment, each of the elements 42 includes an inner section 48 of square cross-section and an outer section 50 of smaller size, to minimize weight, telescoped and fastened into the inner section 48. As best shown in FIGS. 4, 5 and 6, each inner section 48 includes a laterally offset collar portion 52, which is received upon the corresponding stud 38 and pivotally retained on the latter by a washer 53 and a nut 55. Similarly, each element 44 includes an inner section 54 pivotally mounted upon a corresponding stud 40 by a bushing 56 and a nut 58, and an outer section 60 of smaller cross-section telescoped and secured into the inner section 54. The stationary element 46, which is preferably of the same size as the outer sections 50 and 60, is mounted on the plate 36 by telescoping and securing the inner end of same into a mounting collar 62 fastened to the plate 36. It will be noted that the lateral offset between the main longitudinal axis and collar 52 of the inner section 48 of each arm 42 facilitates the folding of all of the elements 42, 44 and 46 into side-by-side relationship when in their stowage disposition, as shown in FIG. 4 and such offset also facilitates the preferred construction of the retaining and releasing parts of the positioning mechanism hereinafter described.

As best seen in FIGS. 1 and 3, the shroud or cover 16 may be formed of any suitable flexible material, such as canvas, cloth or plastic preferably of waterproofed type, and, when the blind is in the closed or covering disposition, provides a complete cover over the top and all sides of the blind, with the possible exception of a small gap 64 that may selectively be left at the top and front of the blind, if desired. It will be understood that the cover 16 includes a pair of opposed, top, inner edges 66 and 68 that are suitably secured in preferably releasable fashion to the upper generally horizontal portions of the outer sections 50 of the elements 42, and a pair of continuing downwardly extending opposed edges 70 and 72 that are similarly secured to the outer downwardly extending portions of the outer sections 50 of the elements 42. The remainder of the shroud 16 extends outwardly over the inner horizontal portions of the arms 44 and 46 and thence downwardly outside of the lower downwardly extending portions of such elements 44 and 46. If desired, the shroud 16 may also be releasably secured in any suitable fashion to the arms 44 and 46, but this will normally not be required. The shroud 16 may, of course, be suitably colored or camouflaged in such manner as may best adapt to field conditions.

Referring next particularly to FIGS. 2 and 5, a channel member 74 having a pair of opposing sidewalls 76 is secured to the bottom of the plate 36, and a front guide flange 78, an intermediate guide flange 80 and a rear guide flange 82 also depend from plate 36 between the latter and the channel 74. The mechanism for releasably positioning the elements 44 alternately in their stowage disposition 44'' (FIG. 4) or in their normal field dispositions includes a suitably positioned hole 84 in each of the sidewalls 76 of the channel 74 and a reciprocal holding pin 86 supported by a bracket means 88 on the bottom of the inner section 54 of each element 44. Spring means 90 are provided for yieldably biasing each of the pins 86 toward the adjacent sidewall 76, in order that the inner end of the pin 86 may be inserted into the corresponding hole 84 whenever the element 44 is swung relative to the plate 36 for bringing the pin 86 into alignment with its hole 84. A loop 92 on the outer end of each pin 86 facilitates its manual withdrawal from the hole 84 against the action of the spring 90 when it is desired to return the blind from its field use condition to its stowage condition.

The releasable positioning mechanism for the elements 42 includes a pair of pointed latch pins 94 reciprocally supported in rear to front parallelism by suitable holes in the front and rear guide flanges 78 and 82. Each pin 94 carries a tab 96 between the guide flanges 78 and 82, a compression spring 98 is provided between the rear guide flange 82 and the tab 96 of each latch pin 94 for yieldably biasing the latter in the direction of its forward, pointed end. The inner section 48 of each element 42 is provided with a toothed rack 100 secured to the bottom thereof and adapted to be engaged in a holding relationship by the pointed end of the corresponding latch pin 94 when such element 42 is moved into its covering disposition shown in solid lines in FIG. 1, 2 and 3. Each rack 100 is of sufficient length and provided with sufficient teeth to permit closure of the front of the shroud 16 either into fully closed relationship or into slightly spaced apart relationship to provide a gap as at 64 (FIG. 3), if desired. It will be observed that because of the forward bias upon the latch pins 94 exerted by the springs 98, any given holding relationship established between the pins 94 and the racks 100 will be maintained to hold the elements 42 in the positions selected until such time as the holding engagement is released by movement of the pins 94 toward the rear. Each of the elements 42 is interconnected with the corresponding element 44 by an elongate tension spring 102, which will quickly move the elements 42 back to their opened dispositions 42' whenever the pins 94 are disengaged from the racks 100.

The improved means for releasing such positioning mechanism for the elements 94 includes a rod 104 reciprocably carried in suitably aligned holes in the intermediate guide flange 80 and the rear guide flange 82. The rod 104 is provided with a crossbar 106 for engaging the front of the tabs 96 and moving the latter and the latch pins 94 to the rear, whenever the rod 104 is itself moved rearwardly.

The assembly 32 is, as previously noted, attached to a forwardly extending bend 108 (FIG. 5) in the standard 30 by suitable screw means 34. A bracket 110 at the rear of the standard 30 adjacent the top thereof pivotally carries a crank 112 having an upstanding arm and a rearwardly extending arm. The upwardly extending arm of the crank 112 is connected in any suitable fashion, as by screw and nut means 114 to the rear of the rod 104, so that rotation of the crank 112 in a counter-clockwise direction as shown in FIG. 1 will draw rod 104 toward the rear, and thereby also move the latch pins 94 toward the rear for releasing their holding engagement with the racks 100 on the elements 42.

Such releasing mechanism further includes an upright connecting link 116 coupling the rearwardly extending arm of the crank 112 with the rear end of an offset lever 118 pivotally mounted as at 120 on the lower frame structure 24, another connecting link 122 coupling the front end of the lever 118 with the rear end of a foot pedal lever 124 that is pivoted as at 126 on a support member 128 suitably secured to and depending from the lower frame structure 24. A tension spring 130 interconnects the forward portion 132 of the foot pedal 124 with the support member 128 to normally hold the foot pedal 124 in a position in which the crank 112 will exert no rearward force on the rod 104 and the pins 94, to permit the latter to remain latched with the racks 100 when the elements 42 are in their closed disposition. The forward portion 132 of the foot pedal is conveniently disposed beneath the front part of the seat 26 where it may be quickly and positively displaced by the user of the blind with his foot and without diverting either his hands or his attention from the mission for which he is employing the blind. It will be observed that the mounting of such releasing mechanism entirely on the frame structure 14 serves to always maintain the foot pedal 124 in its desired relationship to the seat 26, even though the user may rotate the seat 26 and the rest of the blind in any desired direction relative to the terrain by virtue of the rotatable support of the entire blind upon the stake 22 by the collar 28.

The operation of my improved blind may now be briefly explained, although the versatility and advantages thereof should already be appreciated by those skilled in the art. During transportation or stowage, both the elements 42 and the elements 44 will ordinarily be released by rearward movement of the rod 104 to disengage the latch pins 94 from the racks 100 and by manual withdrawal of the pins 86 from the holes 84, and the elements 42 and 44 will have been swung rearwardly to the stowage disposition shown in FIG. 4, either with the shroud 16 still in place thereon or having been removed if the latter is desired. When the blind is to be positioned in the field for use, the stake 12 will be inserted in the ground at the desired location, and the collar 28 will be rotatably emplaced over the protruding section 22 of the stake 12. If the shroud 16 is not already in place over the elements 42, 44 and 46 it may be installed thereon and secured to the elements 42. The elements 44 may then be swung forwardly until their holding pins 86 fall into place within the holes 84 under the influence of the springs 90. The elements 42 may then be swung forwardly to their blind closing disposition, either leaving a small observation gap 64 or not as desired, in which disposition the elements 42 will automatically be latched and held in the chosen positions by the engagement of the latch pins 94 with the racks 100. The user will have positioned himself within the blind and upon the seat 26 before closing the front elements 42, where he will remain until it is desired to open the blind for shooting, photographing, or the like, during which period he may, of course, rotate the blind upon the stake 12 into any desired direction in readiness for the performance of his intended mission. When the moment comes for opening of the blind, the user need merely depress the front portion 132 of the foot pedal 124, whereupon through the linkage previously described the crank 112 will be rotated counterclockwise as shown in FIG. 1, thereby pulling the rod 104 and the latch pins 94 to the rear and releasing the elements 42 carrying the forward portion of the shroud for immediate swinging movement to the rear and approximate positions 42' shown in dotted lines in FIGS. 2 and 3 under the influence of the springs 102. With the blind thus opened, the user is provided with a wide angle, open, frontal area within which to execute his intended mission, it being noted that the swinging of the elements 42 and the portions of the shroud 16 carried thereby to their open dispositions 42' permit the user either to remain seated or to stand, whichever is preferred after opening of the blind. To restore the blind to its closed condition, it is then necessary only to swing the elements 42 back into their forwardly extending positions in which the racks 100 are again engaged and held by the latch pins 94. When a particular field use of the blind is completed, it may be conveniently and quickly restored to a compact condition for transportation or stowage by mere reversal of the steps involved in initial field installation. As will be apparent to those skilled in the art, various portions of the frame structure 14 may, if desired, conveniently be constructed so as to permit possible further disassembly during stowbly 24 or the like.

Thus, it will be seen from the foregoing that a portable blind has been provided in which the shroud or concealment can be easily and rapidly collapsed without the need for the user to hamper or delay any activity he may wish to pursue immediately upon the opening of the blind and without compromising his ability to rapidly perform the functions or operations he intends to accomplish as soon as the blind is opened. It is to be further understood that minor modifications may be made in the invention as described and illustrated without departing from the true spirit of the invention. Therefore, the invention should be limited only by the fair scope of the claims which follow.

I claim:

1. A portable blind comprising:
   a ground-engaging base adapted to be removably supported by the ground;
   frame structure mounted upon said base;
   a plurality of generally inverted L-shaped elements mounted upon said frame structure, at least a front pair of said elements being swingable about respective vertical axes;
   a collapsible cover shroud carried by said elements;
   a releasable positioner mechanism carried by said frame structure for holding said front pair of elements in a forward disposition to dispose said shroud as a substantially closed concealment cover;
   means for automatically swinging said front pair of elements into a rearward disposition presenting a relatively wide frontal opening in said shroud when said mechanism is released; and
   a shiftable member mounted on said frame structure under said shroud and operably coupled with said mechanism for releasing the latter from within the blind when the member is shifted.

2. The invention of claim 1, wherein said member comprises a foot pedal disposed for actuation thereof by a user within the blind without employing his hands.

3. The invention of claim 2, wherein said frame structure is rotatably mounted upon said base, and said foot pedal rotates along with said frame structure as the blind is positioned by the user in any direction relative to the terrain.

4. The invention of claim 2, wherein said mechanism includes a toothed rack carried by each said front pair of elements and a shiftable latch pin for each rack and engagable with the latter in a variety of selectable positions to permit positioning of said front pair of elements when in said forward disposition thereof either to fully close the front of said shroud or to present a narrow observation gap therein.

5. The invention of claim 2, wherein a second pair of said elements are swingable about respective vertical axes, and there is provided releasable holding means for securing said second pair of elements in respective positions extending laterally of said frame structure on opposite sides of the latter.

6. The invention of claim 5, wherein said holding means includes a manually reciprocable pin for each of said second pair of elements and spring means for biasing each of said pins toward a position of interlocking engagement with a portion of said frame structure.

7. The invention of claim 5, wherein both said front pair of elements and said second pair of elements, when released, are swingable into a stowage disposition extending rearwardly from said frame structure in substantial parallelism with each other.

8. The invention of claim 2, wherein said foot pedal member is operably coupled with said mechanism for releasing the latter by means including a crank adjacent the top of said frame structure and linkage means interconnecting said crank and said pedal member.

9. The invention of claim 8, wherein said frame structure is provided with a user seat, and said foot pedal is disposed beneath said seat.

* * * * *